12) United States Patent
Reynolds et al.

(10) Patent No.: US 10,698,486 B2
(45) Date of Patent: Jun. 30, 2020

(54) HAPTIC TACTILE FEEDBACK WITH BUCKLING MECHANISM

(71) Applicant: Synaptics Incorporated, San Jose, CA (US)

(72) Inventors: Joseph Kurth Reynolds, San Jose, CA (US); Doug Krumpelman, Winthrop, WA (US)

(73) Assignee: Synaptics Incorporated, San Jose, CA (US)

( * ) Notice: Subject to any disclaimer, the term of this patent is extended or adjusted under 35 U.S.C. 154(b) by 125 days.

(21) Appl. No.: 15/663,657

(22) Filed: Jul. 28, 2017

(65) Prior Publication Data
US 2019/0033971 A1 Jan. 31, 2019

(51) Int. Cl.
*G06F 3/01* (2006.01)
*G06F 3/041* (2006.01)
*G06F 3/0354* (2013.01)
*G06F 3/044* (2006.01)

(52) U.S. Cl.
CPC .......... *G06F 3/016* (2013.01); *G06F 3/03547* (2013.01); *G06F 3/044* (2013.01); *G06F 3/0414* (2013.01); *G06F 2203/04105* (2013.01)

(58) Field of Classification Search
CPC combination set(s) only.
See application file for complete search history.

(56) References Cited

U.S. PATENT DOCUMENTS

| 4,118,611 | A |   | 10/1978 | Harris |   |
|---|---|---|---|---|---|
| 4,605,828 | A | * | 8/1986 | Gostomski, Jr. | H01H 13/702 200/5 A |
| 6,308,942 | B1 | * | 10/2001 | Ersoy | F16F 13/18 267/140.13 |
| 8,497,786 | B2 | * | 7/2013 | Camacho | G06F 1/1626 341/33 |

* cited by examiner

*Primary Examiner* — William Boddie
*Assistant Examiner* — Alecia D English
(74) *Attorney, Agent, or Firm* — Ferguson Braswell Fraser Kubasta PC

(57) ABSTRACT

A method may include obtaining, using a first set of resulting signals from various proximity sensor electrodes, positional information regarding a location of an input object in a sensing region. The method may include obtaining, using a second set of resulting signals from various force sensor electrodes, force information regarding an input force that is applied to an input surface. The method may include loading, using a loading actuator and in response to the positional information or the force information, energy in a spring element coupled to a buckling element. The spring element may apply a compression force to the buckling element based on the energy in the spring element. The method may include generating, using a buckling actuator and in response to the positional information or the force information, a haptic event by applying a force to the buckling element to trigger the haptic event.

20 Claims, 12 Drawing Sheets

HAPTIC TACTILE FEEDBACK WITH BUCKLING MECHANISM

FIELD

This disclosure generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Moreover, input devices may be integrated with haptic functionality. For example, user inputs may produce specific physical responses within an electronic device that resemble traditional keyboard motions, mechanical switches, and other physical devices. However, haptic operations may require performance of a series of steps to prepare and execute the particular physical response. Specifically, the series of steps may require a fair amount of time between detecting a user input that designates the physical response and the execution of the physical response by the electronic device.

SUMMARY

In general, in one aspect, one or more embodiments relate to an input device. The input device includes an input surface, a buckling element coupled to a spring element, and a loading actuator coupled to the spring element. The loading actuator stores energy in the spring element. The input device further includes a buckling actuator coupled to the buckling element. The buckling actuator applies a force to the buckling element in response to a location of an input object in a sensing region above the input surface or an input force that is applied by the input object to the input surface.

In general, in one aspect, one or more embodiments relate to a processing system coupled to an input device. The processing system includes a sensor module that obtains, from various proximity sensor electrodes of the input device, a first set of resulting signals. The sensor module further obtains, from various force sensor electrodes of the input device, a second set of resulting signals. The processing system further includes a determination module that determines, using the first set of resulting signals, positional information regarding a location of an input object in a sensing region. The determination module further determines, using the second set of resulting signals, force information regarding an input force applied to an input surface. The determination module further loads, using a loading actuator and in response to the positional information or the force information, energy in a spring element coupled to a buckling element. The spring element applies a compression force to the buckling elements based on the energy in the spring element. The determination module further generates, using a buckling actuator and in response to the positional information or the force information, a haptic event by applying a force to the buckling element to trigger the haptic event.

In general, in one aspect, one or more embodiments relate to a method. The method includes obtaining, using a first set of resulting signals from various proximity sensor electrodes, positional information regarding a location of an input object in a sensing region. The method further includes obtaining, using a second set of resulting signals from various force sensor electrodes, force information regarding an input force that is applied to an input surface. The method further includes loading, using a loading actuator and in response to the positional information or the force information, energy in a spring element coupled to a buckling element. The spring element applies a compression force to the buckling element based on the energy in the spring element. The method further includes generating, using a buckling actuator and in response to the positional information or the force information, a haptic event by applying a force to the buckling element to trigger the haptic event.

Other aspects of the disclosed technology will be apparent from the following description and the appended claims.

DETAILED DESCRIPTION

Figure 1:
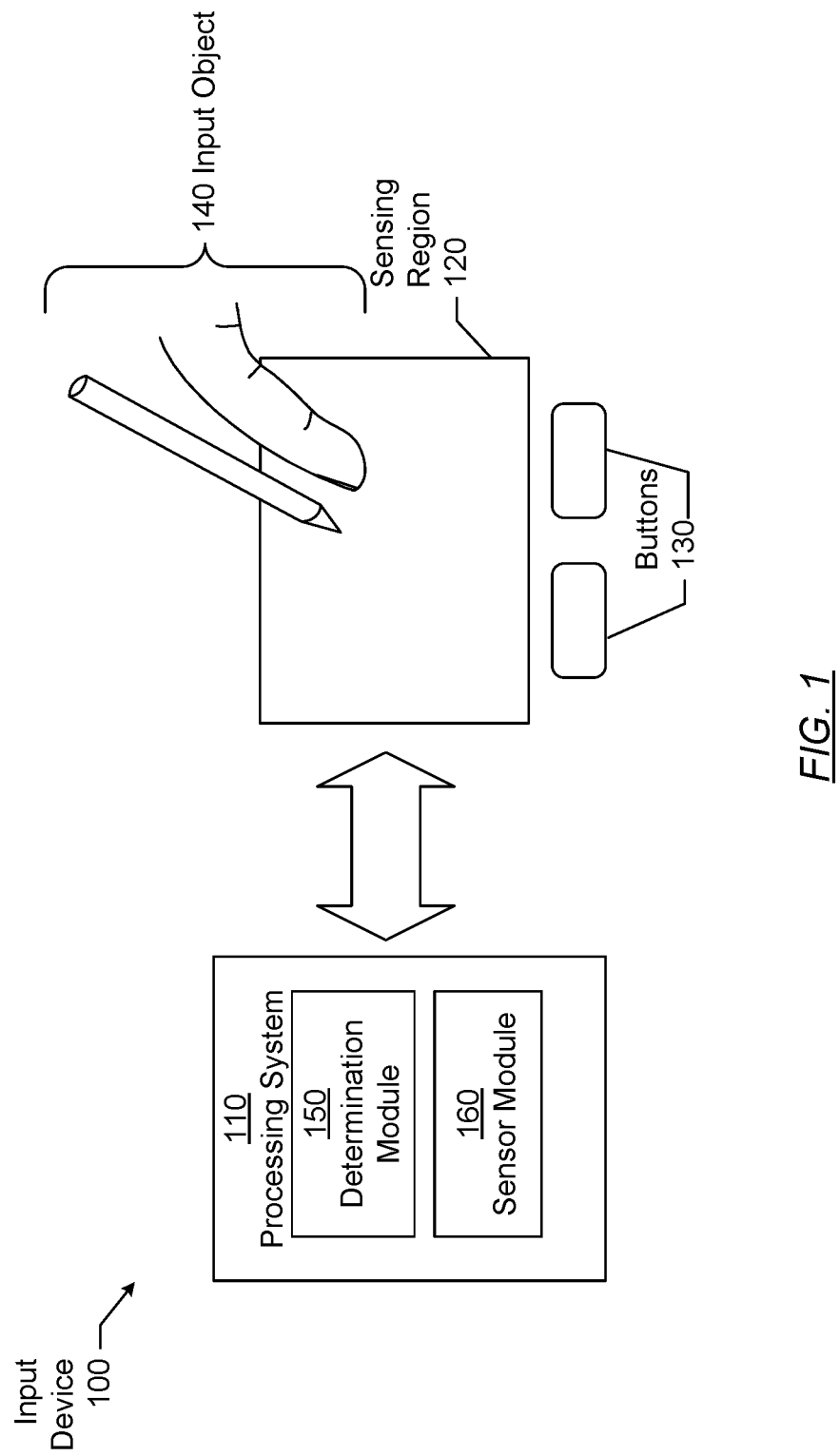
FIG. 1 shows a block diagram of an example system that includes an input device in accordance with one or more embodiments.

Specific embodiments of the disclosed technology will now be described in detail with reference to the accompanying figures. Like elements in the various figures may be denoted by like reference numerals and/or like names for consistency.

The following detailed description is merely exemplary in nature, and is not intended to limit the disclosed technology or the application and uses of the disclosed technology. Furthermore, there is no intention to be bound by any expressed or implied theory presented in the preceding technical field, background, brief summary or the following detailed description.

In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosed technology provide input devices and methods that facilitate improved usability. In particular, one or more embodiments of the disclosed technology are directed to providing haptic actuation via a buckling element. By storing energy in a spring element, the internal forces within the buckling element may approach the level of compression where the buckling element produces a bending motion. Thus, a buckling actuator coupled to the buckling element may provide the additional force to rapidly cause the buckling element to generate a haptic event. Likewise, the buckling actuator may be triggered in response to various types of user inputs, such as a specific location of an input object in a sensing region and/or an amount of input force applied by the input object to an input surface. Thus, haptic actuation with a short latency time may be produced using a preloaded spring element.

Turning now to the figures, FIG. 1 is a block diagram of an exemplary input device (100), in accordance with embodiments of the disclosed technology. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object may be used. Although the singular form is used, multiple input objects may exist in the sensing region (120). Further, the particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and, in various embodiments, the reference voltage may be system ground. In some embodiments, transmitter sensor electrodes may be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators/mechanisms (not shown), etc.

The processing system (110) may be implemented as a set of modules that handle different functions of the processing system (110). Each module may include circuitry that is a part of the processing system (110), firmware, software, and/or a combination thereof. In various embodiments, different combinations of modules may be used. For example, as shown in FIG. 1, the processing system (110) may include a determination module (not shown) and a sensor module (not shown). The determination module may include functionality to determine when at least one input object is in a sensing region, determine signal to noise ratio, determine positional information of an input object, identify a gesture, determine an action to perform based on the gesture, a combination of gestures or other information, and/or perform other operations (e.g. preload a buckling element or determine that the buckling element is not preloaded and needs to be preloaded by a loading actuator).

The sensor module may include functionality to drive the sensing elements to transmit transmitter signals and receive the resulting signals. For example, the sensor module may include sensory circuitry that is coupled to the sensing elements. The sensor module may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Alternative or additional modules may exist in accordance with one or more embodiments. Such alternative or additional modules may correspond to distinct modules or sub-modules of one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, haptic actuation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes (e.g. metal mesh, Indium Tin Oxide, Silver Nano-wires, etc.) overlaying the display screen and provide a touch screen interface for the associated electronic system. The display screen may be any type of dynamic display capable of displaying a visual interface to a user, and may include any type of light-emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments are described in the context of a fully-functioning apparatus, the mechanisms of the various embodiments are capable of being distributed as a program product (e.g., software) in a variety of forms. For example, the mechanisms of various embodiments may be implemented and distributed as a software program on information-bearing media that are readable by electronic processors (e.g., non-transitory computer-readable and/or recordable/writable information bearing media that is readable by the processing system (110)). Additionally, the embodiments may apply equally regardless of the particular type of medium used to carry out the distribution. For example, software instructions in the form of computer readable program code to perform one or more embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion an embodiment may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosed technology. For example, various components may be combined to create a single component. As another example, the functionality performed by a single component may be performed by two or more components. Accordingly, for at least the above-recited reasons, embodiments of the disclosed technology should not be considered limited to the specific arrangements of components and/or elements shown in FIG. 1.

Figure 2:
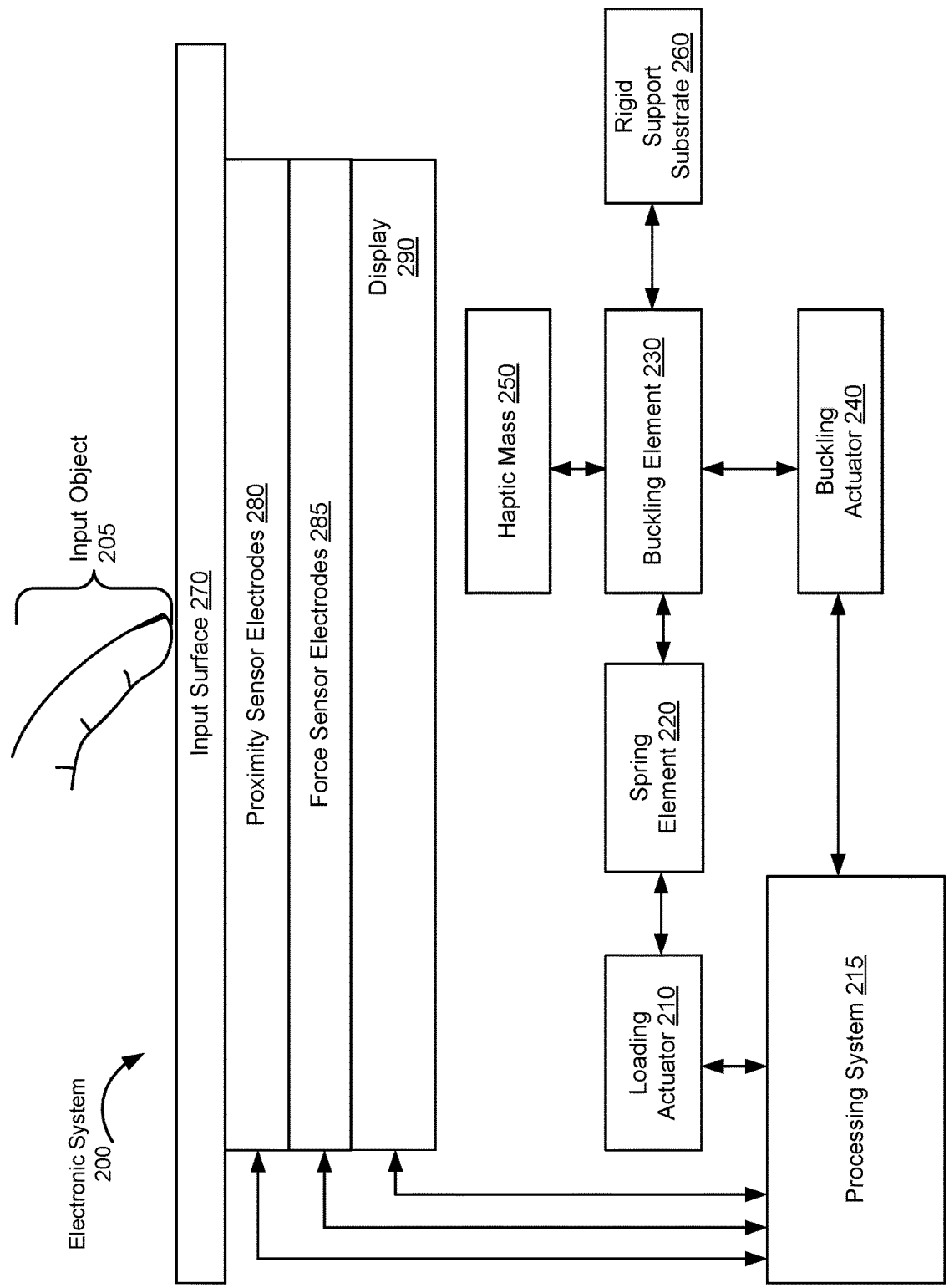
FIG. 2 shows an electronic system in accordance with one or more embodiments.

FIG. 2 shows a schematic view of an electronic system (200) in accordance with one or more embodiments. In one or more embodiments, the electronic system (200) includes various proximity sensor electrodes (280) that include functionality to determine positional information regarding one or more input objects (e.g., input object (205)) in a sensing region. The electronic system (200) may also include various force sensor electrodes (285) that include functionality to determine force information regarding an input force applied by one or more input objects (e.g., input object (205)) to an input surface (e.g., input surface (270)) of the electronic system (200). Moreover, the electronic system (200) may further include a display device (e.g., display (290)). While the electronic system (200) in FIG. 2 is shown with a display, in one or more embodiments, the electronic system (200) does not include a display device. Likewise, the electronic system (200) may include a processing system (215) that is communicatively coupled to the proximity sensor electrodes (280), force sensor electrodes (285), and/or the display (290). The processing system (215) may be similar to processing system (110) described in FIG. 1 and/or the computing system (800) described in FIG. 8 and the accompanying description.

In one or more embodiments, the electronic system (200) includes functionality for preloading a buckling element (230) using an applied compression force. In one or more embodiments, for example, the spring element (220) preloads the buckling element (230) with a lateral force in response to a command by the processing system (215). In particular, the spring element (220) may be a compression spring, a rotary spring, a leaf spring, or any other type of spring with functionality to apply a force to the buckling element (230). In one or more embodiments, the spring element (220) is a circular array and/or a linear array of springs. For example, an array of springs may be coupled with respective buckling elements in a buckling element array. In response to a specific haptic event, all or a portion of the respective buckling elements may be triggered using one or more buckling actuators (e.g. at different times or locations).

Furthermore, a compression force may be applied to the spring element (230) using a loading actuator (210). In particular, the loading actuator (210) may include one or more motors (e.g. a linear worm drive, rotary DC motor, piezoelectric, electro-restrictive, thermal expansion, shape memory alloy, etc.). Other examples of a loading actuator may include an electric linear actuator, a piezoelectric actuator, or other type of mechanical device with functionality to apply a force and/or store potential energy in the spring element (220). Furthermore, the loading actuator (210) may include a reduced number of motors in comparison to the number of springs in the spring element (230). In another embodiment, the loading actuator (210) may be an off-center rotary motor that releases and pre-loads a spring element that includes a radial set of springs.

The buckling element (230) may be coupled to a rigid support substrate (260) within the electronic system (200). For example, the rigid support substrate (260) may be a housing for the electronic system (200). Specifically, the rigid support substrate (260) may include functionality to provide a physical support for the buckling element (230) that is opposite the compression force. For example, the rigid support substrate (260) may provide an opposite force to the spring element's compression force in order to produce an internal compression within the buckling element (230).

In one or more embodiments, the electronic system (200) includes a buckling actuator (240) that includes functionality to trigger a haptic event using the buckling element (230). With a preloaded spring element, a haptic event may be rapidly triggered with a much smaller energy (e.g. lower force). As such, the haptic event may be a physical response that resembles a vibration and/or physical resistance experienced by a user of an input device. Examples of haptic events may include ringing, vibrations, sounds, and/or other user sensations. In one or more embodiments, for example, the haptic event is configured to emulate a physical response produced using a tactile switch (e.g. a snap-dome "click").

Keeping with the buckling actuator (240) of FIG. 2, in an Euler column under compression, an applied force may be directed by the buckling actuator (240) that is perpendicular to the force applied by the spring element (220). A resulting compression force applied by the spring element (220) may approach the buckling threshold of the buckling element (230). Specifically, the buckling threshold may correspond to the value of Euler's critical load a column to maintain a straight position. Thus, while the compression force is below the buckling threshold, the buckling element (230) may be substantially planar with respect to the spring element (220).

Once the internal force of the buckling element (230) exceeds the buckling threshold, the buckling element (230) may produce a bending movement that contacts a haptic mass (e.g., haptic mass (250)). In one or more embodiments, the haptic mass (250) is the same as the input surface (205) and/or the rigid support substrate (260). On the other hand, the haptic mass (250) may be a separate physical substrate inside the electronic system (200) that produces a particular haptic effect. Likewise, the bending movement may be a rotation and/or physical translation of the buckling element (230) that generates the haptic event with the haptic mass (250) (e.g. an out-of-plane vertical motion or horizontal motion in-plane with respect to the input surface (270). In contacting the haptic mass (250), for example, the buckling element (230) may produce haptic vibrations or other motions within the electronic system (200) that resemble tactile physical feedback for a user.

In one or more embodiments, the loading actuator (210) produces a buckling force without a buckling actuator (240) (e.g. a loading actuator and a buckling actuator may be combined into a single mechanical component). For example, the loading actuator (210) may reduce a load on the spring element (220), e.g., producing a tension on the spring element (220). In the absence of the tension, the spring element (220) may produce a compression force proximate or above the buckling force of the buckling element (230). Similarly, the buckling element (230), the spring element (220), the buckling actuator (240), and/or the loading actuator (210) may be manufactured from a single substrate within the electronic system (200). For example, combining the buckling element (230) and the spring element (220) into a single substrate may provide support at multiple points with the rigid support substrate (260).

Figure 4A:
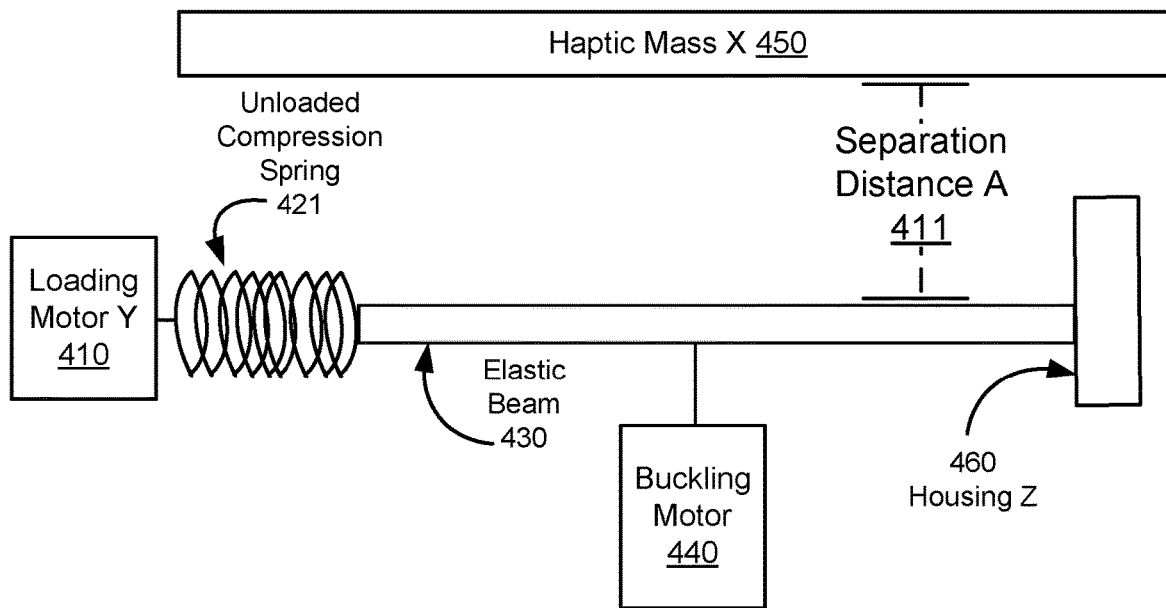
FIG. 4A shows an example of a haptic system in accordance with one or more embodiments.
Figure 4B:
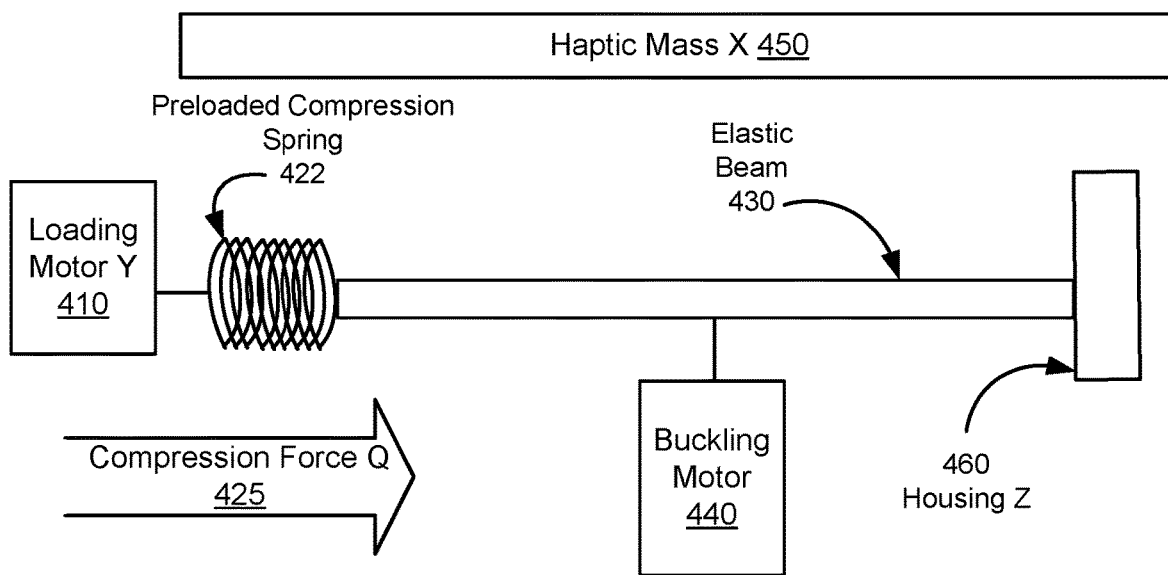
FIG. 4B shows an example of a haptic system in accordance with one or more embodiments.
Figure 4C:
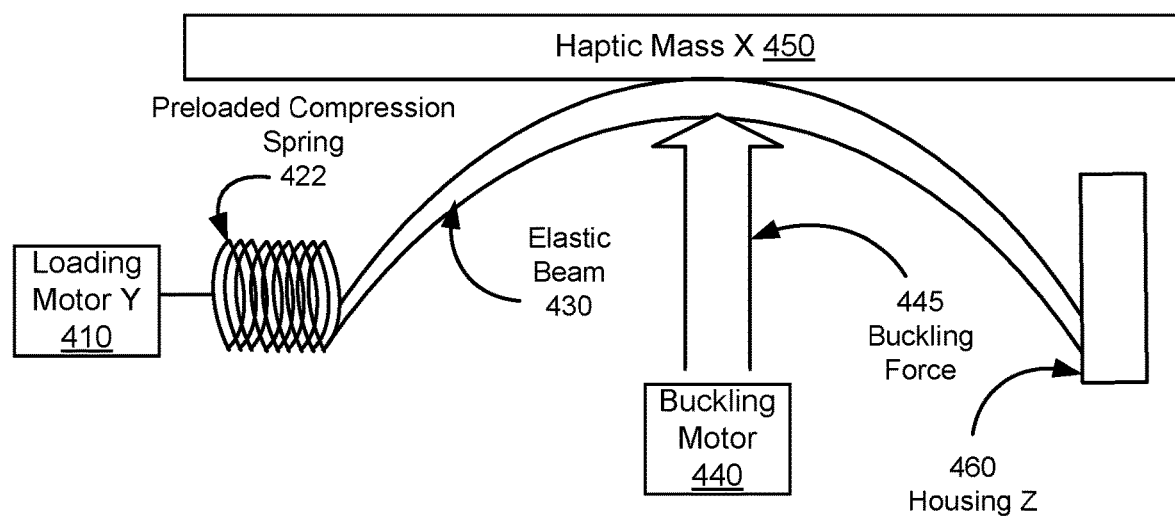
FIG. 4C shows an example of a haptic system in accordance with one or more embodiments.

In another embodiment, a buckling actuator (240) produces a vibratory frequency corresponding to a resonance of a buckling mode in the buckling element (230). To cause a haptic event, the buckling element (230) may release stored (e.g. pre-loaded) energy to move a haptic mass, excite a resonant mass, and/or strike a rigid support substrate (260), such as a frame, that is coupled to the input surface (270). As such, the spring energy may be released in a much shorter time and with a lower energy than other haptic triggering mechanisms. Furthermore, as shown in FIGS. 4A-4C below, a separation distance may be spaced between a haptic mass and a buckling element. In another embodiment, a haptic mass may be directly coupled to the buckling element (230), or the haptic mass and the buckling element may be combined into a single mechanical component, e.g., a piezoelectric or SMA substrate, a disk, and/or a beam. Likewise, the single mechanical component may be preloaded into a near buckling condition such that a further small excitation causes a buckling event. Moreover, a loading actuator, the spring element, the haptic mass, the buckling element, and the buckling actuator may be disposed on a single substrate within a single actuation system. In another example, with respect to an inertial type haptic feedback, movement of the buckling element (250) may also produce a movement of a coupled haptic mass.

In one or more embodiments, various gimbals, levers, linkages, gears and/or other mechanical components are combined with the buckling element (230) and/or buckling actuator (240) to produce a particular mechanical effect. For example, the additional mechanical components may change the direction of the buckling force or scale the buckling force in a particular direction. In another embodiment, a rotary spring may be the preloaded spring element (e.g. loaded by a rotary motor as the loading actuator) and an escapement may be used to allow repeated discrete triggered haptic energy releases (e.g. for repeated events or to drive a resonant element). In another embodiment, a linear spring may be the preloaded spring element (e.g. loaded by a linear motor as the loading actuator) and a ratchet may be used to allow repeated discrete triggered energy releases. (e.g. for repeated events or to drive a resonant element). In another embodiment, a piezoelectric disk may be radially loaded in a mounting and where the piezoelectric disk is near the buckling threshold while preloaded (e.g. close to buckling out of plane into a hemisphere from a flat disk or vice versa). Then, a lateral force may be applied (e.g. a voice coil attached to the disk with a magnet on the mounting, or by reversing the polarity of the preload drive)) to trigger the disk to buckle. The piezoelectric disk may be activated to release, straighten, and then preload the stored energy after buckling. Likewise, the piezoelectric disk may be excited to near the loaded 1st resonant frequency of the buckling (e.g. greater than 20 kHz) to trigger buckling and haptic energy release.

While FIG. 2 shows a configuration of components, other configurations may be used without departing from the scope of the disclosed technology. For example, various components may be combined to create a single component. As another example, the functionality performed by a single component may be performed by two or more components of FIG. 2. Accordingly, for at least the above-recited reasons, embodiments should not be considered limited to the specific arrangements of components and/or elements shown in FIG. 2.

Figure 3:
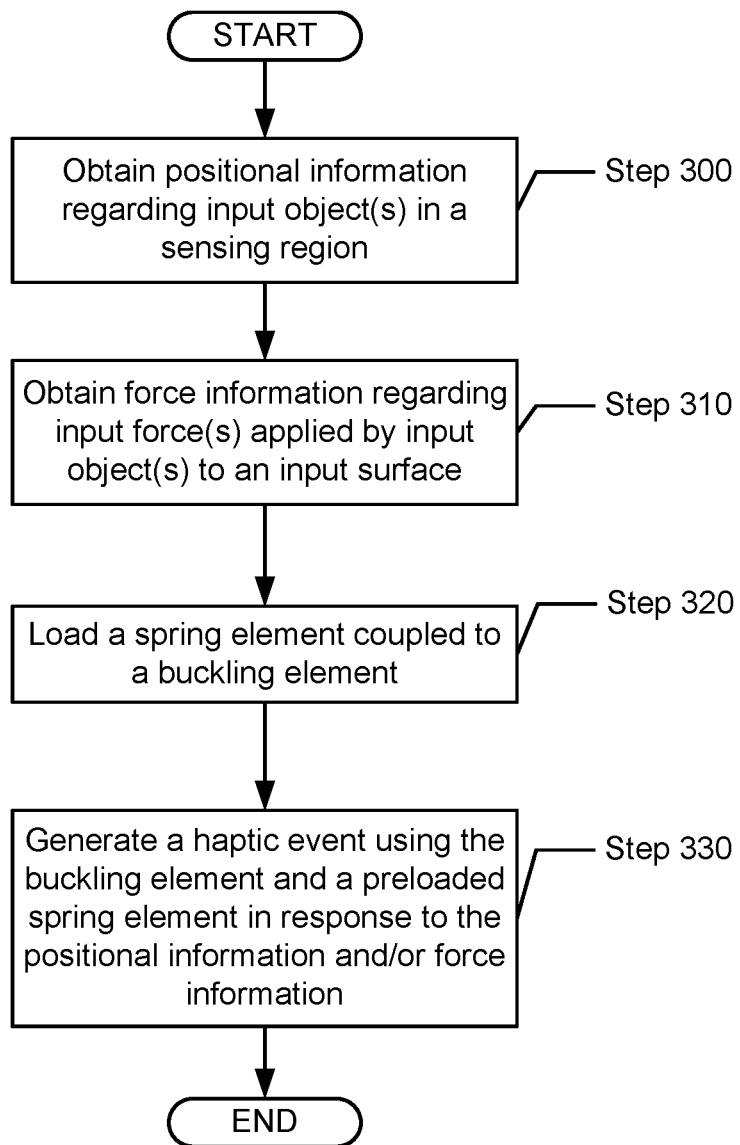
FIG. 3 shows a flowchart in accordance with one or more embodiments.

Turning to FIG. 3, FIG. 3 shows a flowchart in accordance with one or more embodiments. Specifically, FIG. 3 describes a method for operating an input device. The process shown in FIG. 3 may involve, for example, one or more components discussed above in reference to FIGS. 1-2 (e.g., processing system (110)). While the various steps in FIG. 3 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, positional information is obtained regarding one or more input objects in a sensing region in accordance with one or more embodiments. In one or more embodiments, for example, the positional information is obtained using the proximity sensor electrodes (280) described in FIG. 2 and the accompanying description. Likewise, the proximity sensor electrodes may be transmitter electrodes and/or receiver electrodes as described in FIG. 1 and the accompanying description.

In Step 310, force information is obtained regarding one or more input forces applied by one or more input objects to an input surface in accordance with one or more embodiments. In one or more embodiments, for example, the positional information is obtained using the force sensor electrodes (285) described in FIG. 2 and the accompanying description. In one or more embodiments, force information is detecting using one or more embodiments described below in FIGS. 7A, 7B, and/or 7C and the accompanying description.

In Step 320, a spring element is loaded that is coupled to a buckling element in accordance with one or more embodiments. In one or more embodiments, for example, a processing system causes application of a compression force to a spring element coupled to the buckling element. For example, the processing system may control a loading actuator and cause the loading actuator to load the spring element. The spring element may be similar to spring element (220) described in FIG. 2 and the accompanying description, while the buckling element may be similar to buckling element (230) described in FIG. 2 and the accompanying description or alternately the spring element and buckling element may be designed as two combined attributes of a single mechanical part. In particular, the processing system may cause the spring element to be loaded at periodic intervals. For example, after a haptic event is produced with the buckling element, the processing system may apply a compression force to the spring element within a specified time after the haptic event, e.g., 50 milliseconds, 100 milliseconds, etc. Thus, the spring element may be pre-loaded in advance of triggering an additional haptic event. Likewise, reloading the spring element may be used to dampen and/or shift the frequency of any remaining resonance or vibrations in the buckling element resulting from a previous haptic event.

In one or more embodiments, the spring element is loaded without a loading actuator. For example, the spring element may have a set preload on the spring element that may be proximate and below the buckling threshold. A preloading adjustment mechanism may be coupled to the spring element that may adjust an amount of compression force applied to a buckling element. In other words, the preloading adjustment mechanism may tune the spring element by increasing and/or reducing the amount of compression force depending on the type of haptic event. In one embodiment, the preloading adjustment mechanism is a set screw. Likewise, other embodiments of the preloaded adjustment mechanism are contemplated that may include folded springs, cantilevers, clamps, and fixtures, etc.

In Step 330, a haptic event is generated using a buckling element and a pre-loaded spring element in response to positional information and/or force information in accordance with one or more embodiments. With the pre-loaded spring element from Step 320, a processing system may trigger a haptic event based on positional information obtained above in Step 300 and/or force information obtained in Step 330. The haptic event may be generated in response to a specific type of positional information obtained from one or more input objects. For example, if a finger is located in a particular haptic region of an input device, the processing system may trigger the haptic event. Likewise, various gesture movements detected by the processing system may also correspond to various types of haptic movements produced by the input device. Moreover, force information from Step 310 may determine a type of haptic event produce by the processing system.

In one or more embodiments, the buckling element generates a haptic event with a low latency. In particular, applying a buckling force in connection with a preloaded spring element may reduce the amount of time, e.g., latency, between a processing system obtaining positional information and/or force information and the execution of the haptic event by the buckling actuator. For example, other tactile force generators may be large and use a high amount of power (e.g. voltage or current) to produce haptic events with long, e.g. greater than 30 milliseconds (ms) latencies because they may not store energy in the system. Such tactile force generators may include rotary and linear resonant motor, for example to increase a force amplitude, with haptic masses that shake an input surface (e.g. laterally or vertically) to provide a specific haptic response. Even with boosted pre-emphasis of the force amplitude, resonant rise and fall times of the haptic event may be longer than 10 ms. Likewise, the latency between an input object touching an input surface and amplitude of the haptic event may affect user perception of the haptic effectiveness of the haptic event. Moreover, the duration of a haptic event may be short in comparison to the amount of time between haptic events, e.g., more than 100 ms. Thus, the reduced latency requirements on the loading actuator and the buckling actuator may reduce the size, power, and cost required to produce an input device with particular haptic functionality.

In another embodiment, an input device may include multiple buckling elements for generating a haptic event in Step 330. For example, an input device may include multiple preloaded spring elements coupled to respective buckling elements. Based on positional information and/or force information, a processing system may select a particular intensity of the haptic event. The processing system may produce a low intensity haptic event using a single preloaded spring element. For a high intensity haptic event, multiple preloaded spring elements may be triggered to produce a haptic motion against one or more haptic masses. Likewise, in another embodiment, multiple springs may be loaded with energy at approximately similar times and then triggered in series to produce a particular tactile movement. For example, a controlled sequence of buckling actuators may produce a series of closely spaced haptic events.

Turning to FIGS. 4A, 4B, and 4C, FIGS. 4A, 4B, and 4C provide an example of generating a haptic event using a buckling element. The following example is for explanatory purposes only and not intended to limit the scope of the disclosed technology.

Turning to FIG. 4A, FIG. 4A shows an elastic beam (430) coupled to an unloaded compression spring (421), a buckling motor (440), and a housing Z (460). The unloaded compression spring (421) is further coupled to a loading motor Y (410). Likewise, the elastic beam (430) is proximate a haptic mass X (450), e.g., where a separation distance A (411) is between the haptic mass X (450) and the elastic beam (430). Turning to FIG. 4B, the loading motor Y (410) receives a command from a processing system (not shown) to apply a compression force Q (425) to the unloaded compression spring (421). The result of the compression force Q (425) produces a preloaded compression spring (422) that transmits the compression force Q (425) to the elastic beam (430). As such, internal compression forces inside the elastic beam (430) approach the buckling threshold of the elastic beam (430).

Turning to FIG. 4C, FIG. 4C shows a buckling motor (440) triggering a haptic event using a buckling force (435) upon the elastic beam (430). In response to positional information and/or force information from an input object (not shown), a processing system (not show) may send a command to the buckling motor (440) to apply a buckling force (445) to the elastic beam (430). Because the preloaded compression spring (422) is already providing a compression force to the elastic beam (430), the buckling force (445) is sufficient to produce a buckling motion in the elastic beam (430) and contact the haptic mass X (450). The contact of the elastic beam (430) may produce a physical vibration or other physical movement that is detectable by a user of the input device.

Furthermore, while the buckling motor (440) is shown in FIGS. 4A-4C as being perpendicular with the elastic beam (430), in one or more embodiments, a buckling actuator may be approximately planar with a spring element and a buckling element. In particular, the buckling actuator and/or the spring element (220) may be disposed at a variety of different angles with respect to one or more haptic masses and/or the buckling element. Likewise, various types of buckling are contemplated in haptic systems that include buckling actuators and/or preloading spring elements. For example, the buckling movement of the buckling element may include flexural-torsional buckling, lateral-torsional buckling, dynamic buckling, static buckling, multiple bucklings of a single buckling element, etc. The buckling element, spring (energy storage) element, and haptic mass may be cut and folded from a flat material, or molded and milled to increase the stored energy, control the buckling threshold, as well as, reduce the time required to actuate the buckling. The design may also reduce the direct sensitivity to assembly, or mechanical input from the user to prevent accidental activation.

Figure 5:
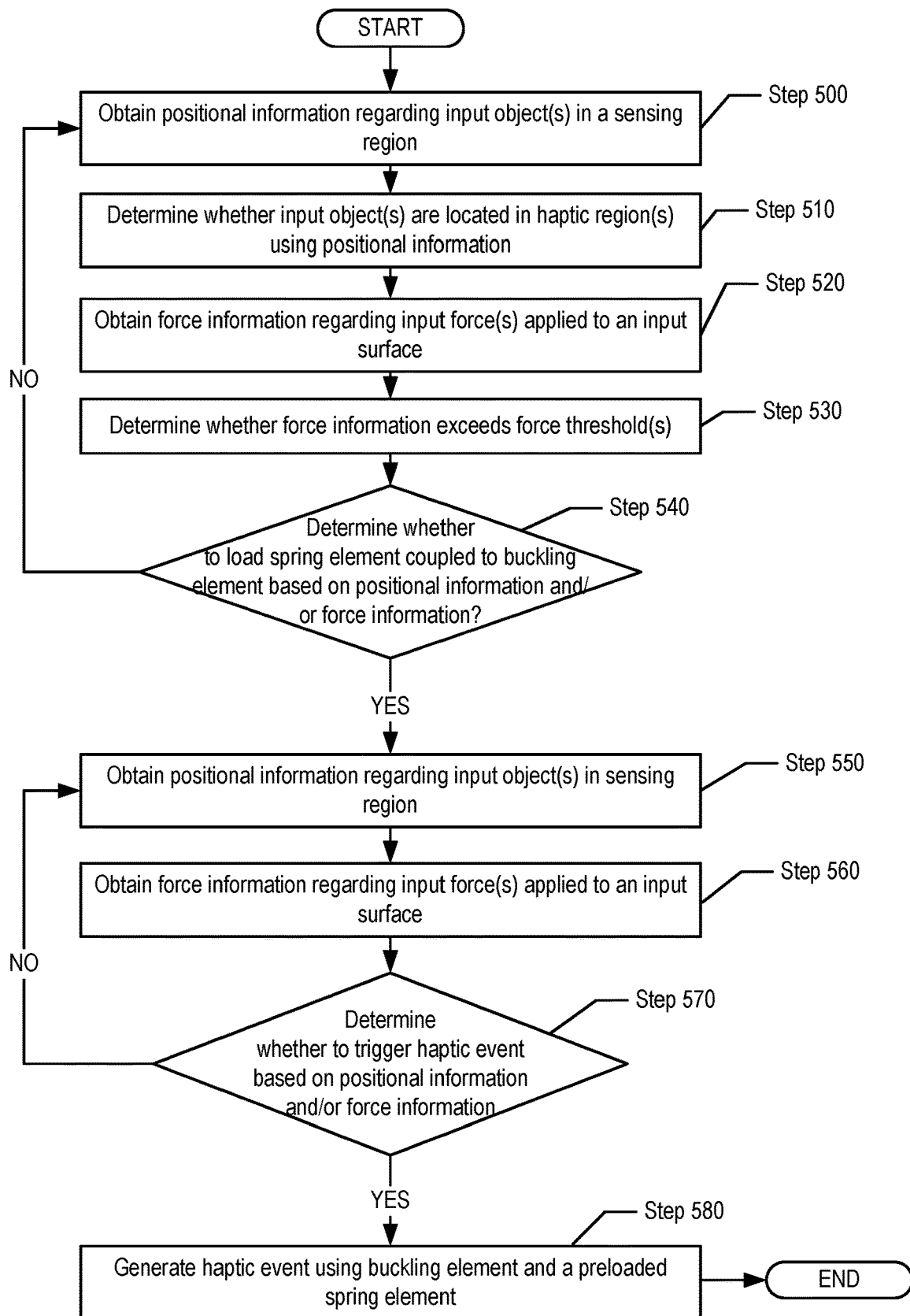
FIG. 5 shows a flowchart in accordance with one or more embodiments.

Turning to FIG. 5, FIG. 5 shows a flowchart in accordance with one or more embodiments. Specifically, FIG. 5 describes a method for operating an input device. The process shown in FIG. 5 may involve, for example, one or more components discussed above in reference to FIGS. 1-2 (e.g., processing system (110)). While the various steps in FIG. 5 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 500, positional information is obtained regarding one or more input objects in a sensing region in accordance with one or more embodiments. Step 500 may be similar to Step 300 described in FIG. 3 and the accompanying description.

In Step 510, a determination is made whether one or more input objects are located in one or more haptic regions using positional information in a sensing region in accordance with one or more embodiments. For example, a haptic region may be defined by a set of positional information coordinates and/or a specific capacitive response obtained by various proximity sensor electrodes. Likewise, haptic position regions may be dynamic or static. In one or more embodiments, for example, a haptic position region may correspond to a graphical user interface window presented within a display device. Based on the changing shape of the graphical user interface window, the corresponding haptic position region may also change. In other embodiments, haptic position regions may correspond to graphical icons, keys on a virtual keyboard, etc.

Figure 6A:
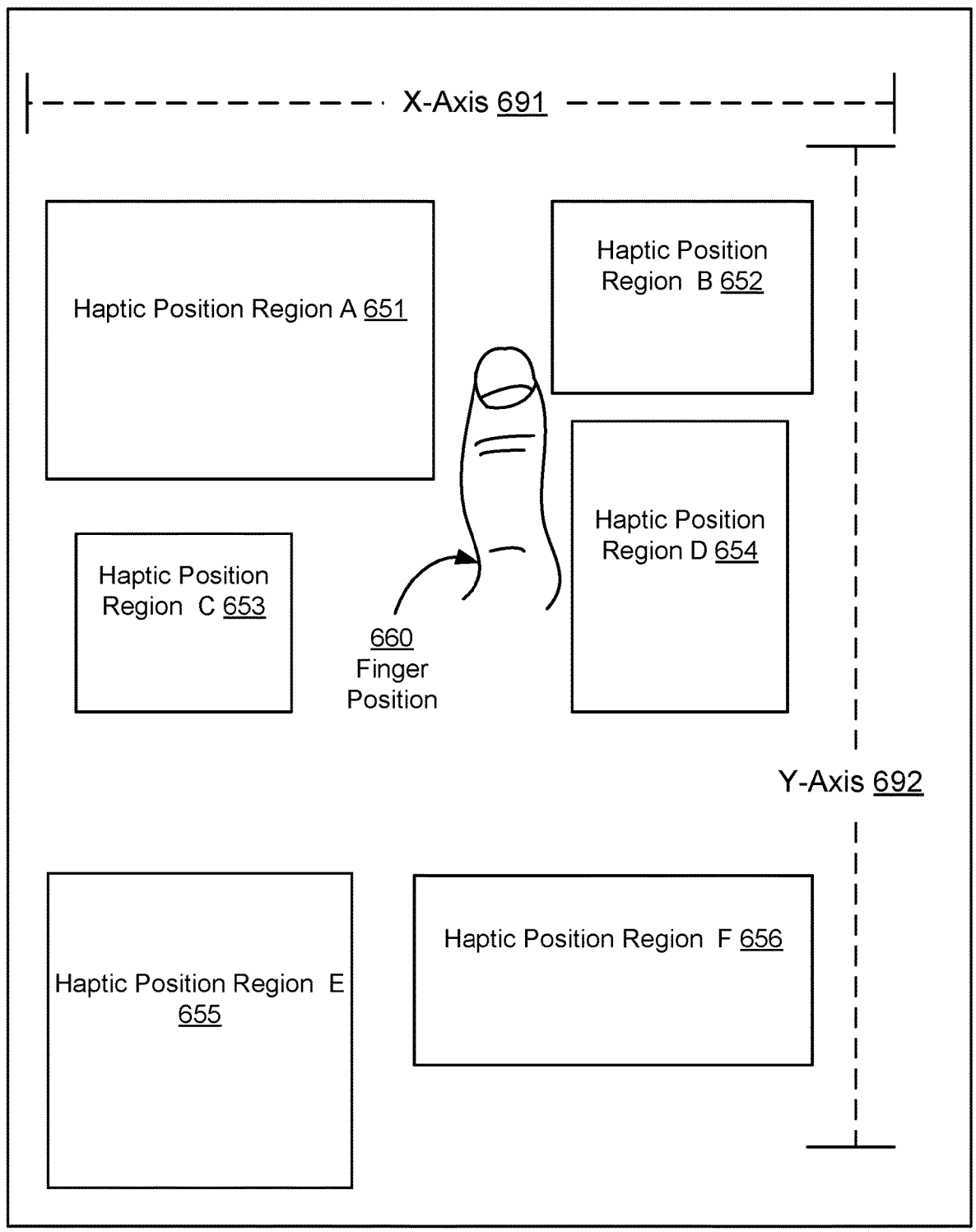
FIG. 6A shows an example of various haptic regions in accordance with one or more embodiments.

Turning to FIG. 6A, FIG. 6A shows an example of a sensing region for an input device in accordance with one or more embodiments. As shown in FIG. 6A, various haptic regions (e.g., haptic region A (651), haptic region B (652), haptic region C (653), haptic region D (654), haptic region E (655), haptic region F (656)) may be defined within the sensing region. For example, the sensing region of FIG. 6A may have an x-axis (691) and/or a y-axis (692) that correspond to various position coordinates. For example, based on the location of an input object (e.g., finger position (660)) in the sensing region, one or more haptic events may be trigged based on whether the input object is located within a particular haptic position region. While not shown in FIG. 6A, one or more haptic position regions may overlap with one or more other haptic position regions, thereby causing multiple haptics events when an input object is located within multiple haptic position regions.

Returning to FIG. 5, in Step 520, force information is obtained regarding one or more input forces applied to an input surface in accordance with one or more embodiments. Step 520 may be similar to Step 310 described in FIG. 3 and the accompanying description.

In Step 530, a determination is made whether force information exceeds one or more force thresholds in accordance with one or more embodiments. Specifically, in response to an application of an input force by an input object, a processing system may determine whether the input force exceeds the high force threshold using force information. In one or more embodiments, for example, a force threshold is defined by the processing system according to whether one or more force values associated with the input force are at or above a specified limit. Thus, the processing system may compare the force information from an input force to the force values designated by a particular force threshold to determine whether the input force exceeds the high force threshold. In one or more embodiments, an input device includes two or more force thresholds. For more information on force thresholds, see FIGS. 6B, 6C, and 6D and the accompanying description below.

Figure 6B:
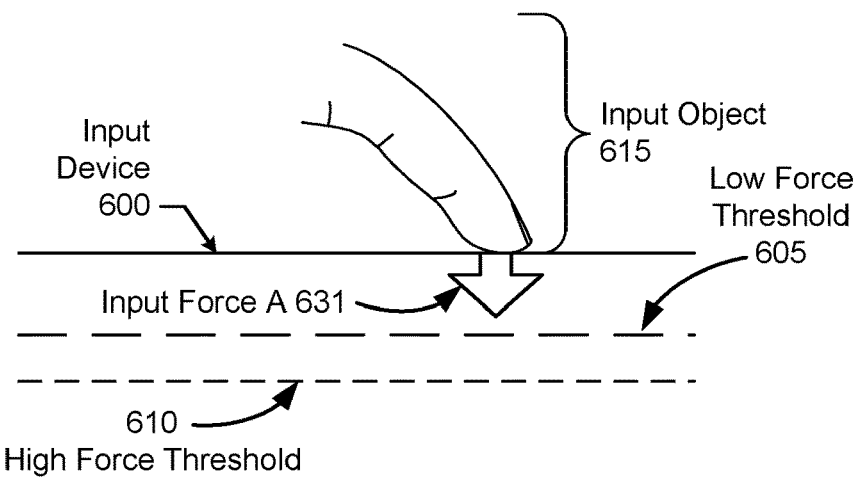
FIG. 6B shows an example of various force thresholds in accordance with one or more embodiments.
Figure 6C:
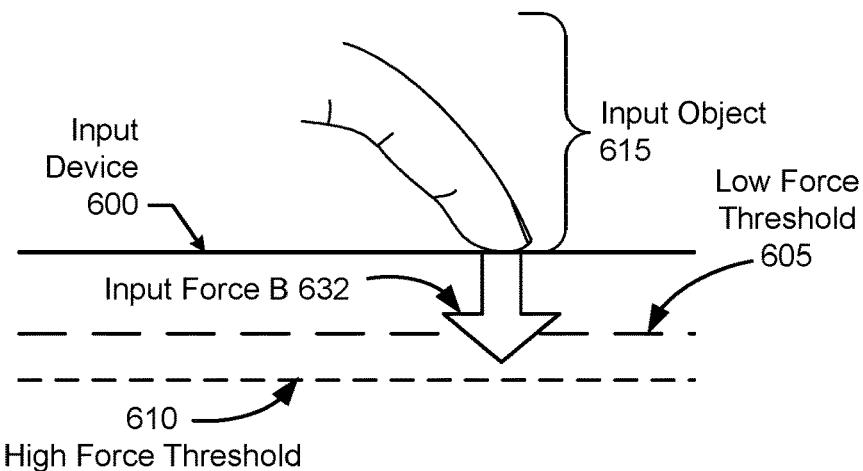
FIG. 6C shows an example of various force thresholds in accordance with one or more embodiments.
Figure 6D:
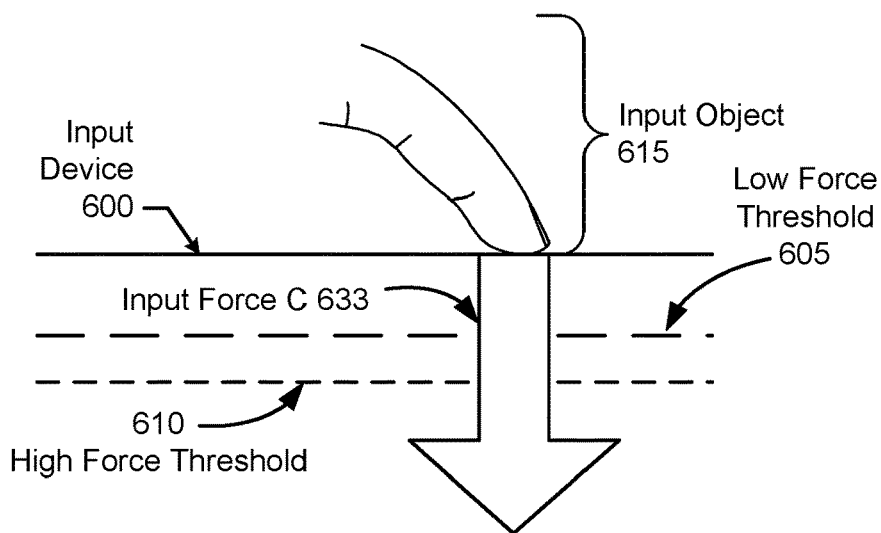
FIG. 6D shows an example of various force thresholds in accordance with one or more embodiments.

Turning to FIGS. 6B, 6C, and 6D, FIGS. 6B, 6C, and 6D show cross-sectional diagrams of an input device in accordance with one or more embodiments. As shown in FIGS. 6B-6D, an input object (615) may apply various input forces (e.g., input force A (631), input force B (632), and input force C (633)) to an input device (600). In particular, an input force may include an amount of force exerted by the input object (615) to an input surface of the input device (600). Thus, the input force may span various locations in a sensing region of the input device (600), and may also include one or more different force magnitudes at different locations of the input surface.

In one or more embodiments, the input device (600) includes a low force threshold (605) and a high force threshold (610). As such, the force thresholds (605, 610) may correspond to different values of force information, which may categorize different intensities for different input forces. In one or more embodiments, a force threshold corresponds to a specific amount of force (e.g., a specific magnitude of force and/or pressure). In one or more embodiments, a force threshold corresponds to a range of different force magnitudes. For example, the low force threshold (605) and the high force threshold (610) may be designated in a lookup table accessed by a processing system. While force thresholds may be defined using various amounts of force, in one or more embodiments, a force threshold is defined using the duration of time that an input force is applied above a specific force value. In one or more embodiments, a force threshold is defined by an amount of area on an input surface that obtains an input force above a specific force value.

Furthermore, as shown in FIG. 6B, the input force A (631) has a force magnitude that is below both the low force threshold (605) and the high force threshold (610). In comparison, as shown in FIG. 6C, the input force B (632) has a force magnitude that exceeds the low force threshold (605), but fails to surpass the high force threshold (610). As shown in FIG. 6D, the input force C (633) may surpass both the low force threshold (605) and the high force threshold (610). In one embodiment multiple thresholds may be used to implement hysteresis (e.g. press and release thresholds for a button) to prevent falls triggering. While two force thresholds are shown in FIGS. 6B-6D, other embodiments are contemplated where three or more force thresholds are implemented using an input device and/or processing system. Likewise, force thresholds may move (e.g. tracking environmental changes) in response to a filtered force input.

Furthermore, categorizing an input force as a low force or a high force by whether a respective force exceeds a high force threshold should not be intended as an actual description of the force magnitude of the respective force. The terminology between low forces and high forces is merely used to distinguish that one force threshold corresponds to a greater force value than the force value corresponding to a different force threshold.

Returning to FIG. 5, in Step 540, a determination is made whether to load a spring element coupled to a buckling element based on positional information and/or force information in accordance with one or more embodiments. For example, a processing system may load one or more spring elements in response to obtaining specific positional information regarding an input object and/or force information regarding an input force. In one or more embodiments, for example, a hard press, i.e., an input force that exceeds multiple force thresholds may cause the processing system to load the spring element. Likewise, when the input force falls below one or more of the force thresholds, the processing system may further cause the haptic event to trigger. Note that other inputs may be available such as information about the preload state of the spring such that either an additional preload may not be necessary, or in the case of accidental activation an additional preload may be necessary and in these cases determination of preloading for the spring may be inhibited or induced out of order. When a determination is made not to load the spring element, the process may return to Step 500. When a determination is made to load the spring element, the process may proceed to Step 550.

In Step 550, positional information is obtained regarding one or more input objects in a sensing region in accordance with one or more embodiments. In particular, after a spring element is preloaded, a processing system may continue to scan a sensing region for positional information that may trigger one or more haptic events. Step 550 may be similar to Step 300 described in FIG. 3 and the accompanying description.

In Step 560, force information is obtained regarding one or more input forces applied to an input surface in accordance with one or more embodiments. After a spring element is preloaded, a processing system may further monitor an input device for one or more input forces that may trigger one or more haptic events. Step 560 may be similar to Step 310 described in FIG. 3 and the accompanying description.

In Step 570, a determination is made whether to trigger a haptic event based on positional information and/or force information in accordance with one or more embodiments. Based on the positional information from Step 550 and/or the force information from Step 560, a processing system may determine whether to trigger one or more haptic events. When a determination is made to wait on triggering a haptic event, the process may return to Step 550. When a determination is made that a haptic event is triggered, the process may proceed to Step 580.

In Step 580, a haptic event is generated using a buckling element and a preloaded spring element in accordance with one or more embodiments. Step 580 may be similar to Step 330 described in FIG. 3 and the accompanying description.

Figure 7A:
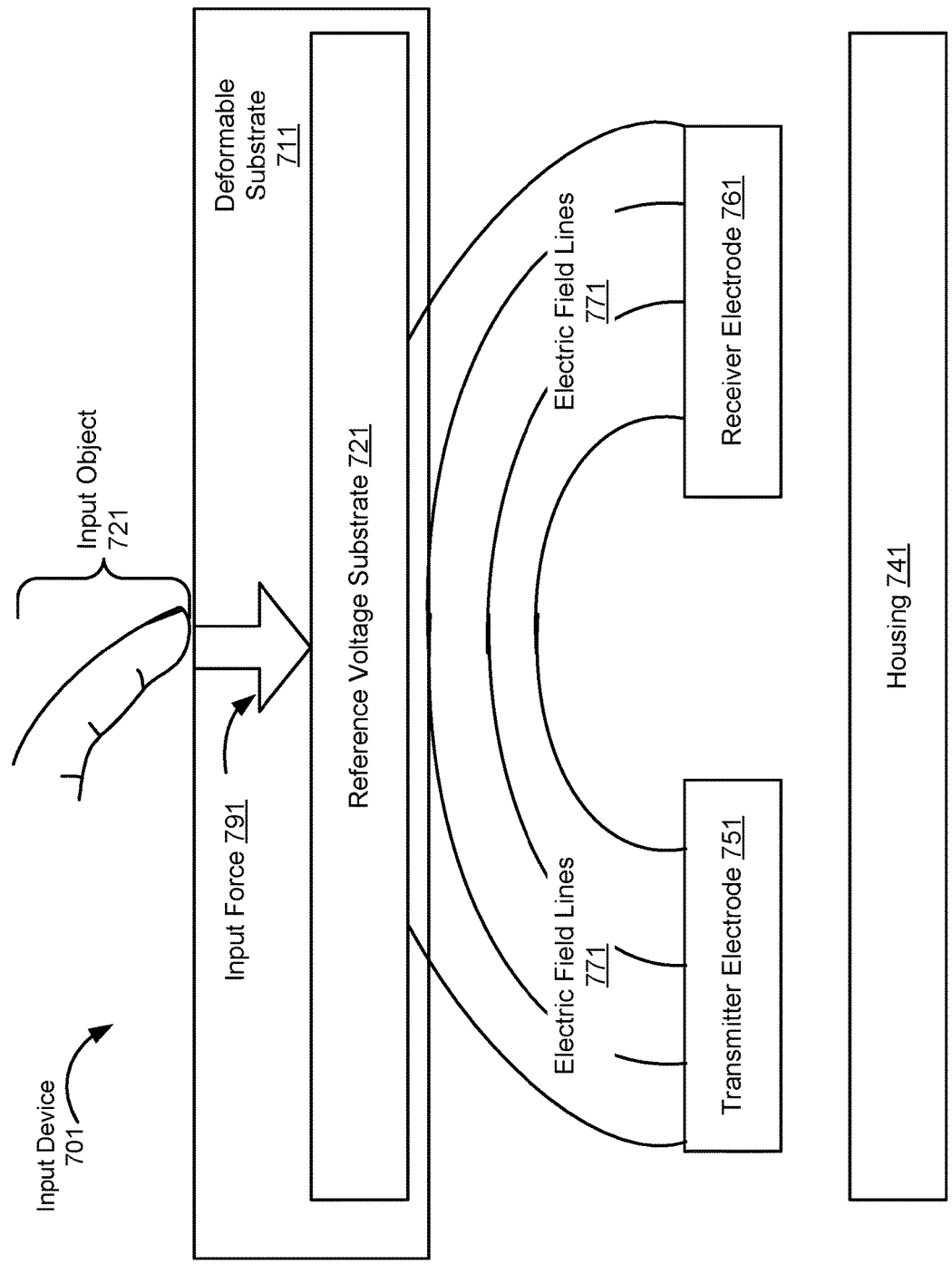
FIG. 7A shows a schematic diagram of a capacitive sensing system in accordance with one or more embodiments.
Figure 7B:
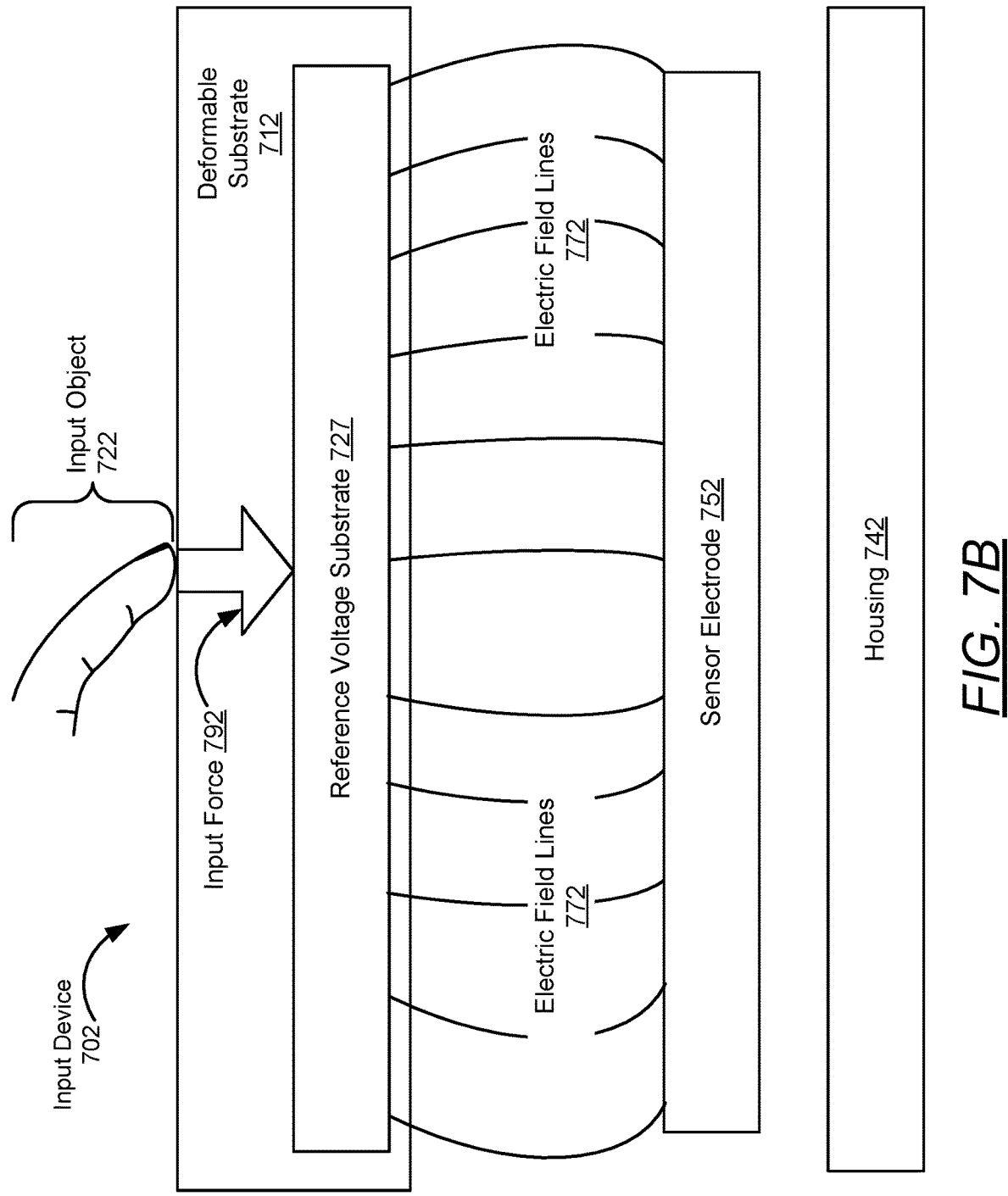
FIG. 7B shows a schematic diagram of a capacitive sensing system in accordance with one or more embodiments.
Figure 7C:
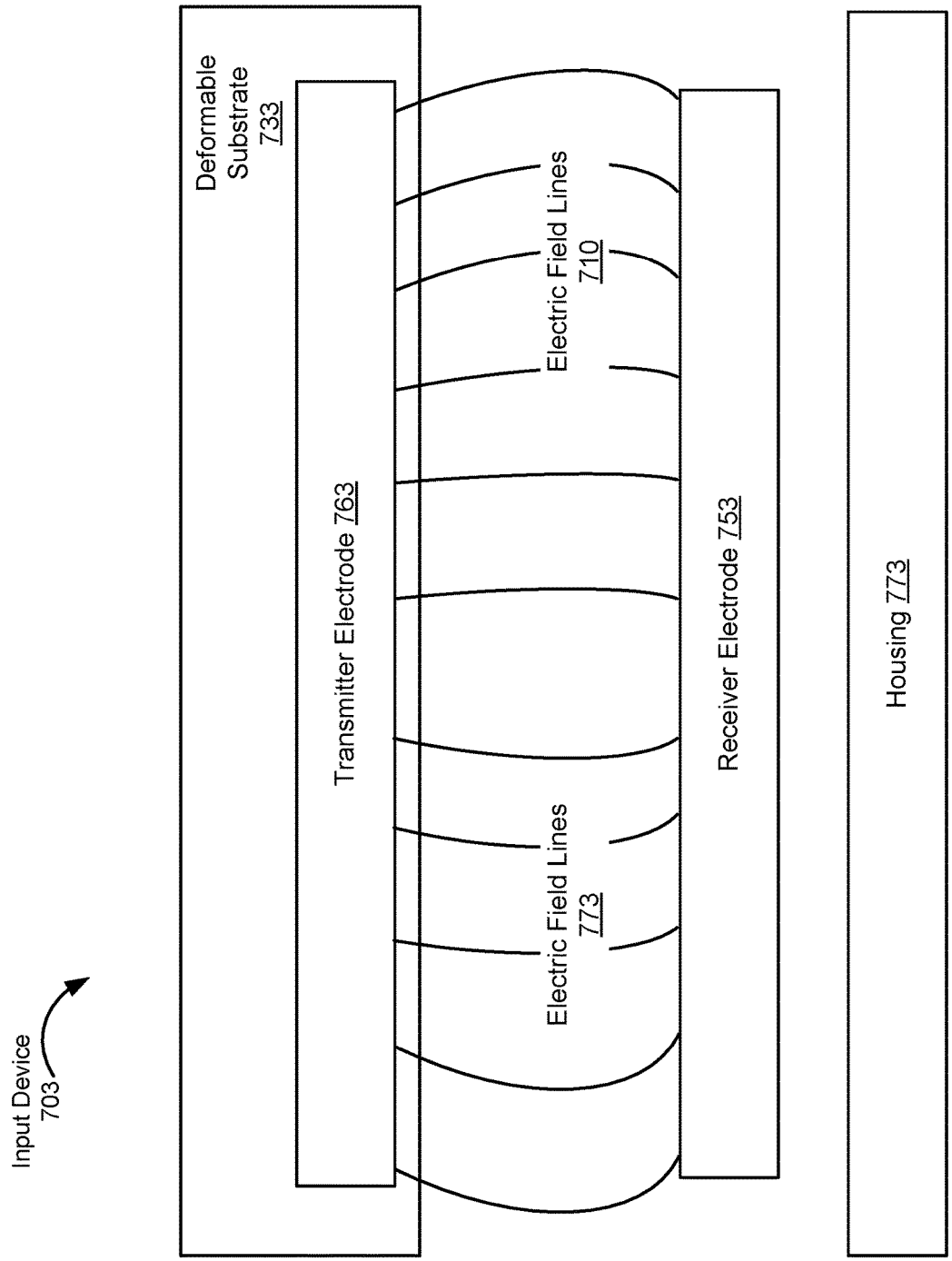
FIG. 7C shows a schematic diagram of a capacitive sensing system in accordance with one or more embodiments.

Turning to FIGS. 7A, 7B, and 7C, FIGS. 7A, 7B, and 7C show schematic diagrams in accordance with one or more embodiments. As shown in FIG. 7A, an input device (701) may include a deformable substrate (711), a housing (741), a transmitter electrode (751), and a receiver electrode (761). The deformable substrate (711) may include functionality to change shape or flex in response to an input force (791) applied by an input object (721). For example, the deformable substrate (711) may be an elastic and flexible material that deflects toward the housing (741) in response to the input force (791). In one or more embodiments, the deformable substrate (711) may be the display (290) and/or input surface (270) described in FIG. 2 and the accompanying description.

Keeping with FIG. 7A, the deformable substrate (711) may include a reference voltage substrate (726). The reference voltage substrate (726) may be conductive material that includes functionality to generate a reference voltage for capacitive coupling with the transmitter electrode (761) and the receiver electrode (731). The capacitive coupling illustrated, for example, by the electric field lines (771). Accordingly, the reference voltage substrate (726) may be ohmically coupled with a power source inside an electronics system. The reference voltage substrate (726) may be located on the surface of the deformable substrate (711) and/or disposed inside the deformable substrate (711). Moreover, the deformable substrate (711) may be a single layer or various discrete components of uniform or different sizes. Additionally, the reference voltage substrate (726) may be a component of a display used for display updating.

In one or more embodiments, the input device (701) of FIG. 7A is implemented within the electronic system (200) of FIG. 2. In one or more embodiments, for example, the reference voltage substrate (726) is disposed in the display (290). Moreover, the transmitter electrode (761) and the receiver electrode (731) may form a portion of the proximity sensor electrodes (280), for example, in the electronic system (200).

Turning to FIG. 7B, an input device (702) includes a deformable substrate (712), a housing (742), a sensor electrode (752), and a reference voltage substrate (727). As shown in FIG. 7B, capacitive coupling is illustrated, for example, by the electric field lines (772). Accordingly, an input force (792) applied by an input object (722) produces a change in variable capacitance between the sensor electrode (752) and the reference voltage substrate (727). In one or more embodiments, the reference voltage substrate (727) may be a component of the display used for display updating.

Turning to FIG. 7C, an input device (703) includes a deformable substrate (713), a housing (743), a transmitter electrode (763), and a receiver electrode (753). As shown in FIG. 7C, capacitive coupling is illustrated, for example, by the electric field lines (773). Accordingly, an input force (793) applied by an input object (723) produces a change in variable capacitance between the transmitter electrode (763) and the receiver electrode (753). In one or more embodiments, the transmitter electrode (763) may be disposed on a display within the deformable substrate (713). In various embodiments, the transmitter electrode (763) may be a component of the display used for updating. In various embodiments, the transmitter electrode (763) may be a component of the input sensing system of the input device (703) (i.e. used to determine positional information of input objects in a sensing region of the input device). Input device (702) and input device (703) may be implemented in the electronic system (200) of FIG. 2.

Figure 8:
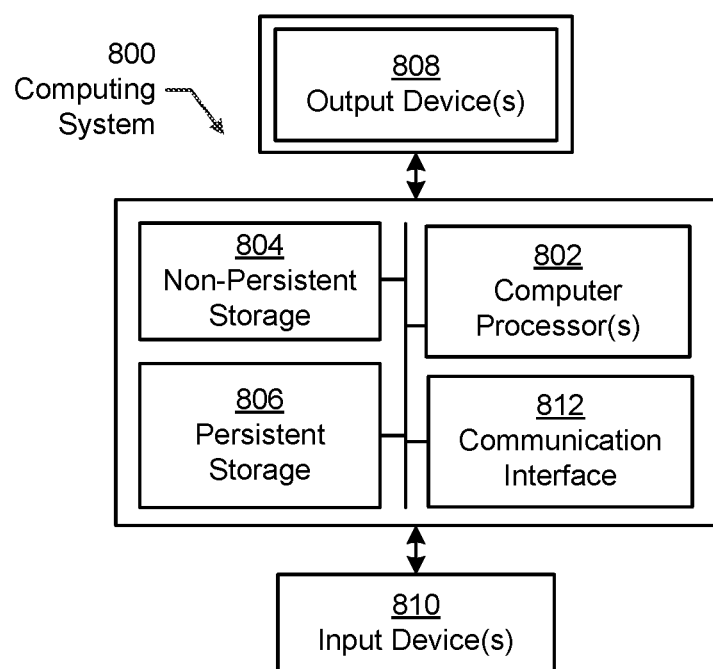
FIG. 8 shows a computing system in accordance with one or more embodiments.

Embodiments may be implemented on a computing system. Any combination of mobile, desktop, server, router, switch, embedded device, or other types of hardware may be used. For example, as shown in FIG. 8, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the disclosed technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

Rather than or in addition to sharing data between processes, the computing system performing one or more embodiments of the disclosed technology may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

The computing system in FIG. 8 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or a data container (e.g., database, table, record, column, view, etc.), identifier(s), conditions (e.g., comparison operators), functions (e.g., join, full join, count, average, etc.), sort (e.g., ascending, descending), or others. The DBMS may execute the statement. For example, the DBMS may access a memory buffer, may access a reference, or may index a file for reading, writing, deletion, or any combination thereof, for responding to the statement. The DBMS may load the data from persistent or non-persistent storage and perform computations to respond to the query. The DBMS may return the result(s) to the user or software application.

The computing system of FIG. 8 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8. Other functions may be performed using one or more embodiments of the disclosed technology.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device comprising:
an input surface;
an elastic buckling element coupled to a spring element, the elastic buckling element configured to buckle upon application of a buckling actuator force;
a force-generating loading actuator coupled to the spring element, the force-generating loading actuator configured to, upon receiving a command signal from a processing system, store energy in the spring element; and
a force-generating buckling actuator coupled to the buckling element,
wherein the force-generating buckling actuator is configured to apply the buckling actuator force to the elastic buckling element when energy is stored in the spring element and to produce a haptic event, and
wherein the force-generating buckling actuator is configured to apply the buckling actuator force to the elastic buckling element in response to a location of an input object in a sensing region above the input surface or an input force applied by the input object to the input surface.

2. The input device of claim 1,
wherein the energy stored in the spring element is configured to generate a compression force that is applied to the elastic buckling element, and
wherein the force-generating buckling actuator is configured to apply an amount of the buckling actuator force to produce the haptic event with the compression force.

3. The input device of claim 1, wherein the force-generating buckling actuator and the force-generating loading actuator are a single mechanical component.

4. The input device of claim 1, wherein the spring element and the elastic buckling element are a single mechanical component.

5. The input device of claim 1, wherein the force-generating buckling actuator, the force-generating loading actuator, the spring element, and the elastic buckling element are disposed in a single substrate.

6. The input device of claim 5, wherein the single substrate is formed into a disk or a beam.

7. The input device of claim 1, further comprising:
a plurality of elastic buckling elements;
a plurality of spring elements coupled to the plurality of elastic buckling elements; and
a plurality of force-generating loading actuators coupled to the plurality of spring elements,
wherein the plurality of force-generating loading actuators store energy in the plurality of spring elements in parallel, and
wherein the haptic event comprises the plurality of elastic buckling elements being triggered in series by a plurality of force-generating buckling actuators.

8. The input device of claim 1, wherein the force-generating loading actuator comprises a rotary motor configured to apply a compression force to the spring element to store the energy in the spring element.

9. The input device of claim 1, wherein the elastic buckling element is an elastic beam configured to generate vibrations using a physical mass in response to the buckling actuator force applied by the force-generating buckling actuator.

10. The input device of claim 1, further comprising:
a plurality of proximity sensing electrodes coupled to the input surface, the plurality of proximity sensing electrodes configured to detect the location of the input object; and
a plurality of force sensor electrodes coupled to the input surface, the plurality of force sensor electrodes configured to detect the input force applied to the input surface.

11. The input device of claim 10, further comprising:
a processing system coupled to the plurality of proximity sensor electrodes and the plurality of force sensor electrodes,
wherein the processing system is configured to cause the force-generating loading actuator to store the energy in the spring element in response to positional information determined using the plurality of proximity sensing electrodes or force information determined using the plurality of force sensor electrodes.

12. The input device of claim 11,
wherein the processing system is further configured to determine whether the input force exceeds a force threshold, and
wherein the spring element is configured to release the energy to produce the haptic event in response to the input force exceeding the force threshold.

13. The input device of claim 11,
wherein the processing system is further configured to determine whether the location of the input object is within a haptic position region in the sensing region, and
wherein the spring element is configured to release the energy to produce the haptic event in response to the input object being located in the haptic position region.

14. The input device of claim 11, wherein the processing system is further configured to reload the spring element using the force-generating loading actuator at a predetermined time after producing the haptic event.

15. A processing system coupled with an input device, comprising:
a sensor module, the sensor module configured to:
obtain, from a plurality of proximity sensor electrodes of the input device, a first plurality of resulting signals, and
obtain, from a plurality of force sensor electrodes of the input device, a second plurality of resulting signals; and
a determination module, the determination module configured to:
determine, using the first plurality of resulting signals, positional information regarding a location of an input object in a sensing region,
determine, using the second plurality of resulting signals, force information regarding a first input force applied to an input surface,
load, using a force-generating loading actuator and in response to a command signal generated by the processing system based on the positional information or the force information, first energy in a spring element coupled to an elastic buckling element, wherein the spring element applies a compression force to the elastic buckling element based at least part on the first energy in the spring element, and
generate, using a force-generating buckling actuator and in response to the positional information or the force information, a haptic event by applying a buckling actuator force to the elastic buckling element to trigger the haptic event.

16. The processing system of claim 15, wherein the determination module is further configured to:
  determine, using the force information, whether the input force exceeds a predetermined force threshold,
  wherein the first energy is stored in the spring element in response to the input force exceeding the predetermined force threshold.

17. The processing system of claim 15, wherein the determination module is further configured to:
  determine, using the positional information, whether the input object is located inside a haptic position region,
  wherein the first energy is stored in the spring element in response to the input object being located inside the haptic position region.

18. The processing system of claim 15, wherein the determination module is further configured to:
  determine whether a predetermined amount of time has passed since generating the haptic event; and
  store, in response to determining that the amount of time is past, a second energy in the spring element.

19. The processing system of claim 15,
  wherein the energy in the spring element produces a compression force, and
  wherein the buckling actuator force by the force-generating buckling actuator is laterally applied to the elastic buckling element to produce the haptic event.

20. A method, comprising:
  obtaining, using a first plurality of resulting signals from a plurality of proximity sensor electrodes, positional information regarding a location of an input object in a sensing region,
  obtaining, using a second plurality of resulting signals from a plurality of force sensor electrodes, force information regarding an input force applied to an input surface,
  loading, using a force-generating loading actuator and in response to a command signal generated by a processing system based on the positional information or the force information, energy in a spring element coupled to an elastic buckling element, wherein the spring element applies a compression force to the elastic buckling element based at least part on the energy in the spring element, and
  generating, using a force-generating buckling actuator and in response to the positional information or the force information, a haptic event by applying a buckling actuator force to the elastic buckling element to trigger the haptic event.

\* \* \* \* \*